(12) United States Patent
Schaschek et al.

(10) Patent No.: US 9,111,362 B2
(45) Date of Patent: Aug. 18, 2015

(54) METHOD, SYSTEM AND APPARATUS FOR APPLYING HISTOGRAM EQUALIZATION TO AN IMAGE

(71) Applicant: SONY CORPORATION, Minato-ku (JP)

(72) Inventors: Fabian Schaschek, Stuttgart (DE); Matthias Wilde, Stuttgart (DE)

(73) Assignee: SONY CORPORATION, Tokyo (JP)

( * ) Notice: Subject to any disclaimer, the term of this patent is extended or adjusted under 35 U.S.C. 154(b) by 43 days.

(21) Appl. No.: 13/954,226

(22) Filed: Jul. 30, 2013

(65) Prior Publication Data
US 2014/0056517 A1    Feb. 27, 2014

(30) Foreign Application Priority Data

Aug. 22, 2012   (EP) .................................... 12181394

(51) Int. Cl.
*G06K 9/00* (2006.01)
*G06T 5/40* (2006.01)
*G06T 5/00* (2006.01)

(52) U.S. Cl.
CPC .. *G06T 5/40* (2013.01); *G06T 5/009* (2013.01)

(58) Field of Classification Search
None
See application file for complete search history.

(56) References Cited

U.S. PATENT DOCUMENTS

| | | | | |
|---|---|---|---|---|
| 6,643,398 B2 * | 11/2003 | Moriwaki | ..................... | 382/167 |
| 7,113,648 B1 * | 9/2006 | Aihara | .......................... | 382/274 |
| 7,239,756 B2 * | 7/2007 | Sartor et al. | ................... | 382/274 |
| 7,532,755 B2 * | 5/2009 | Thakur | ......................... | 382/170 |
| 7,885,462 B2 * | 2/2011 | Paik | ................................ | 382/168 |
| 8,035,853 B2 * | 10/2011 | Sambongi et al. | ............. | 358/1.9 |
| 2003/0081856 A1 * | 5/2003 | Sartor et al. | ................ | 382/274 |
| 2003/0152283 A1 * | 8/2003 | Moriwaki | ..................... | 382/274 |
| 2003/0161549 A1 * | 8/2003 | Lei et al. | ....................... | 382/274 |
| 2005/0163385 A1 * | 7/2005 | Thakur | ......................... | 382/224 |
| 2007/0165947 A1 * | 7/2007 | Paik | ................................ | 382/169 |
| 2007/0172145 A1 * | 7/2007 | Altunbasak et al. | .......... | 382/274 |
| 2010/0278423 A1 * | 11/2010 | Itoh et al. | ...................... | 382/169 |
| 2011/0135200 A1 * | 6/2011 | Chen et al. | .................... | 382/167 |

FOREIGN PATENT DOCUMENTS

| | | | |
|---|---|---|---|
| EP | 1345172 A1 * | 9/2003 | |
| ES | 1 345 172 A1 | 9/2003 | |
| ES | 1 482 447 A1 | 12/2004 | |

* cited by examiner

*Primary Examiner* — Bhavesh Mehta
*Assistant Examiner* — Feng Niu
(74) *Attorney, Agent, or Firm* — Oblon, McClelland, Maier & Neustadt, L.L.P.

(57) ABSTRACT

A method for applying histogram equalization to an image comprises calculating a histogram of at least one image portion of an input image to obtain histogram data representing the number of occurrences of different brightness values in said at least one image portion. Said histogram data is filled up such that substantially all brightness values have a minimum number of occurrences. A cumulative distribution function is calculated from said filled up histogram data and is equalized in a predetermined range. Finally, said at least one image portion of the input image is remapped based on said equalized cumulative distribution function.

16 Claims, 11 Drawing Sheets

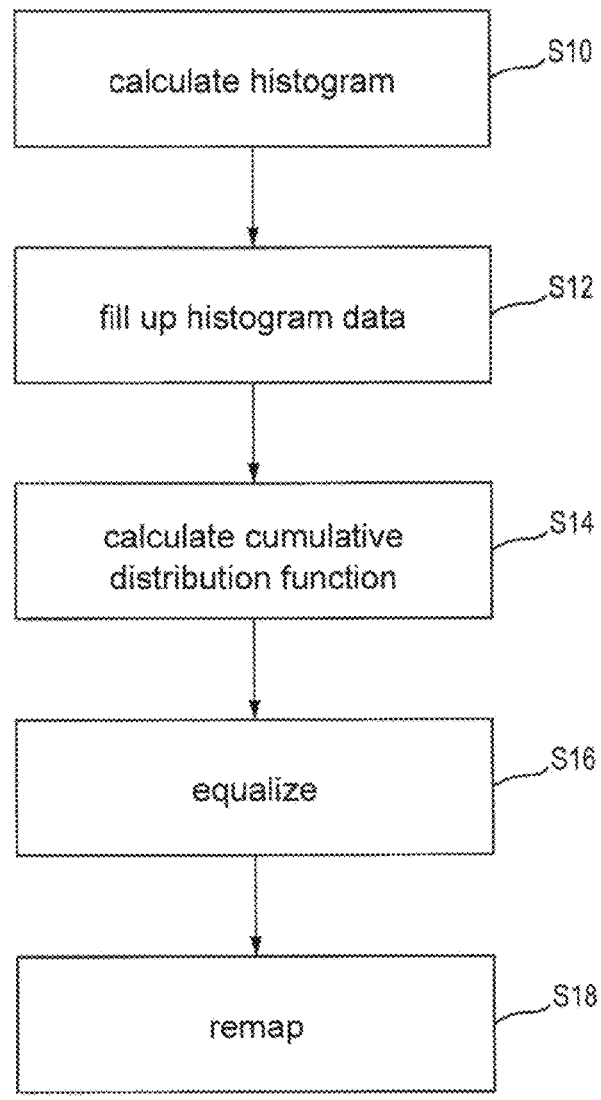
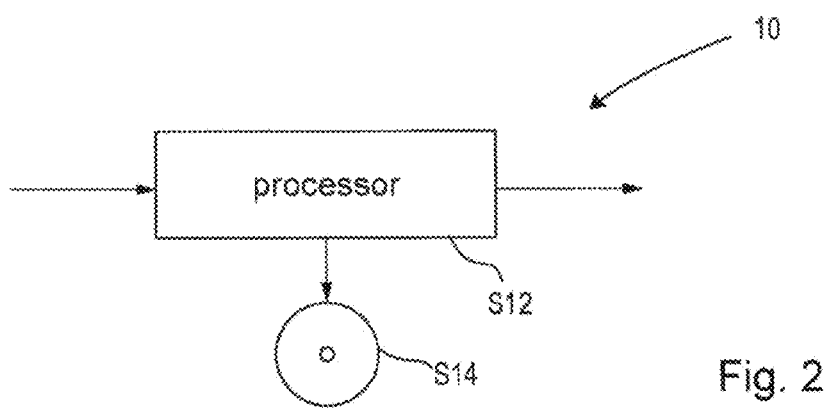
Fig. 1
Fig. 2

METHOD, SYSTEM AND APPARATUS FOR APPLYING HISTOGRAM EQUALIZATION TO AN IMAGE

BACKGROUND

1. Field of the Disclosure

The present disclosure relates to a method, system and apparatus for applying histogram equalization to an image. Further, the present invention relates to a computer program and a non-transitory computer-readable recording medium.

2. Description of Related Art

Known global contrast enhancement algorithms are not able to guarantee a convincing visual performance. Especially in content with a high amount of dark and bright luminance (brightness) values, respectively, the processed images result in over-enhanced and falsified pictures.

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly or impliedly admitted as prior art against the present invention.

SUMMARY

It is an object to provide an improved method, system and apparatus for applying histogram equalization to an image that avoid an over-enhancement or falsification of images having a high amount of dark and bright luminance (brightness) values, respectively.

It is a further object to provide a corresponding computer program and a non-transitory computer-readable recording medium for implementing said method.

According to an aspect there is provided a method for applying histogram equalization to an image, comprising:
  calculating a histogram of at least one image portion of an input image to obtain histogram data representing the number of occurrences of different brightness values in said at least one image portion,
  filling up said histogram data such that substantially all brightness values have a minimum number of occurrences,
  calculating a cumulative distribution function from said filled up histogram data,
  equalizing said cumulative distribution function in a predetermined range, and
  remapping said at least one image portion of the input image based on said equalized cumulative distribution function.

According to a further aspect there is provided a system for applying histogram equalization to an image, said system comprising a processor and a computer-readable non-transitory storage medium, wherein the computer-readable non-transitory storage medium contains instructions for execution by the processor, wherein the instructions cause the processor to perform the steps of:
  calculating a histogram of at least one image portion of an input image to obtain histogram data representing the number of occurrences of different brightness values in said at least one image portion,
  filling up said histogram data such that substantially all brightness values have a minimum number of occurrences,
  calculating a cumulative distribution function from said filled up histogram data,
  equalizing said cumulative distribution function in a predetermined range, and
  remapping said at least one image portion of the input image based on said equalized cumulative distribution function.

According to still further aspects a corresponding apparatus, a computer program comprising program means for causing a computer to carry out the steps of the method disclosed herein, when said computer program is carried out on a computer, as well as a non-transitory computer-readable recording medium that stores therein a computer program product, which, when executed by a processor, causes the method disclosed herein to be performed are provided.

Preferred embodiments are defined in the dependent claims. It shall be understood that the claimed system, apparatus, computer program and computer-readable recording medium have similar and/or identical preferred embodiments as the claimed method and as defined in the dependent claims.

One of the aspects of the disclosure is to avoid an over-enhancement or falsification of images having a high amount of dark and bright luminance values, respectively, by filling up said histogram data such that substantially all brightness values have a minimum number of occurrences. The filled up histogram data are then used for the conventional histogram equalization.

Another aspect of the disclosure, which may also be applied independent from the first aspect, is to linearize a top and/or bottom portion of the equalized cumulative distribution function before remapping the input image based on said equalized cumulative distribution function with linearized top and/or bottom portion. This keeps the black/white impression of the original input image and avoids little contrast differences dark and/or bright areas which could possibly be recognized due to the sensitivity of the eye to distinguish little pixel differences in those areas.

It is to be understood that both the foregoing general description of the invention and the following detailed description are exemplary, but are not restrictive of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 1 shows a flowchart of an embodiment of a proposed method for applying histogram equalization to an image, FIG. 2 shows a schematic diagram of an embodiment of a proposed system for applying histogram equalization to an image.

DESCRIPTION OF THE EMBODIMENTS

Figure 3:
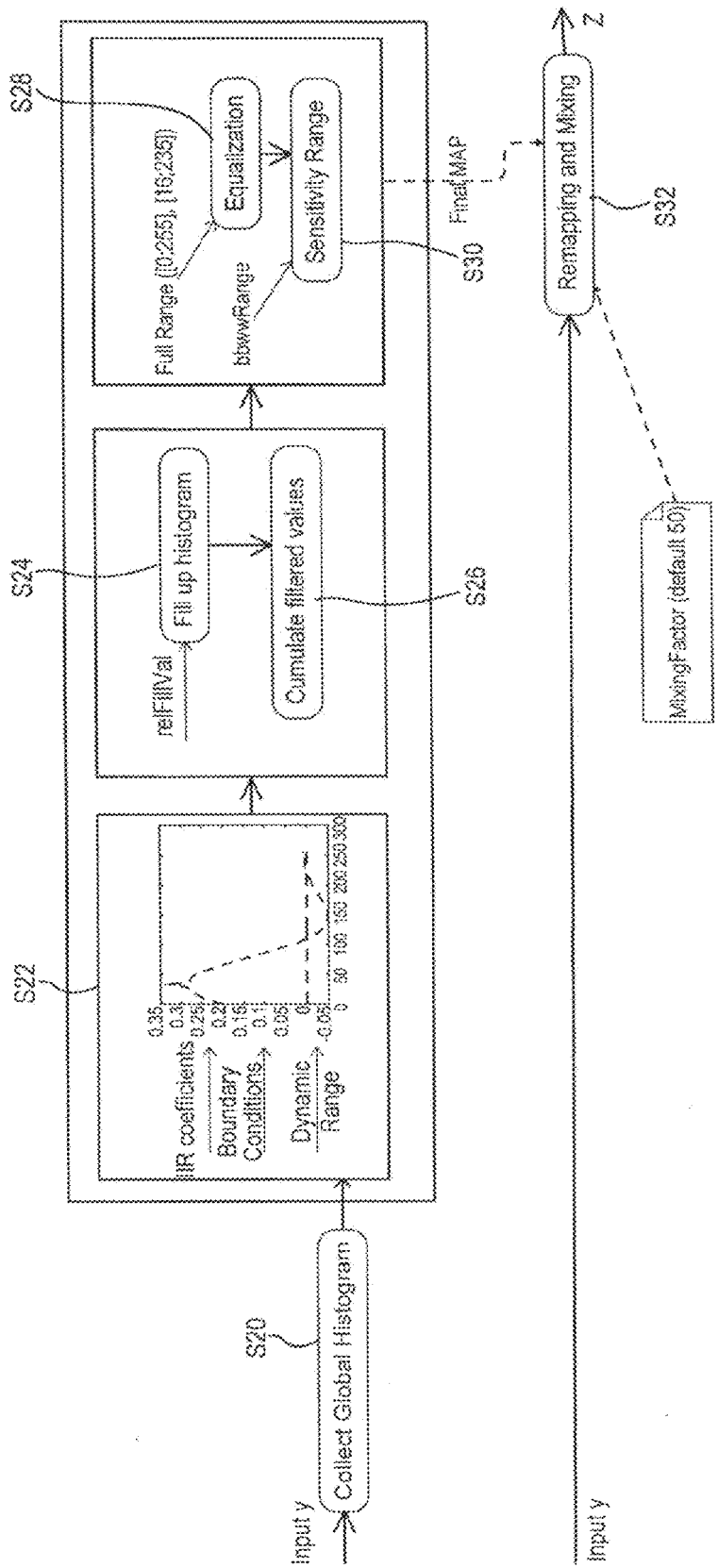
FIG. 3 shows a schematic diagram illustrating another embodiment of a proposed method for applying histogram equalization to an image.

Referring now to the drawings, wherein like reference numerals designate identical or corresponding parts throughout the several views, FIG. 1 shows a flowchart of an embodiment of a proposed method for applying histogram equalization to an image.

In a first step S10 a histogram of at least one image portion of an input image is calculated to obtain histogram data representing the number of occurrences of different brightness values in said at least one image portion. Preferably, a global histogram of a complete input image is calculated, but separately for one or more image portions of the input image may also be calculated (subsequently or in parallel), an image portion representing, for instance, an image object or a block of a predetermined number of pixels. A conventional histogram calculation technique, as commonly known in the art, that may be applied in step S10 comprises counting, pixel by pixel, the number of occurrences of each grey level, i.e. level of luminance (brightness), in an image. The calculated histogram data can be represented as a histogram or as a cumulative distribution function, both of which are well known in the art.

In a second step S12 said histogram data are filled up such that substantially all brightness values have a minimum number of occurrences. Thus, even if an image has, for instance, no (or only a few) dark or bright luminance values this number is now increase to said minimum number.

In a third step S14 a cumulative distribution function is calculated from said filled up histogram data. In a fourth step S16 said cumulative distribution function is equalized in a predetermined range. Finally, in a fifth step S18 said at least one image portion of the input image is remapped based on said equalized cumulative distribution function. Said steps S14, S16 and S18 are, per se, generally known in the art and shall herein only be explained in short. By redistribution of the occurring luminance values the overall global contrast is enhanced. Said redistribution is achieved by cumulating all occurring different luminance values and a subsequent normalization to a defined range, i.e. [0,255]. Each said luminance value obtains a new reallocation to create the new contrast enhanced image.

FIG. 2 shows a schematic diagram of an embodiment of a proposed system 10 for applying histogram equalization to an image. The system 10 comprises a processor 12 and a computer-readable non-transitory storage medium 14. The computer-readable non-transitory storage medium 14 contains instructions for execution by the processor 12, wherein the instructions cause the processor to perform the steps of the proposed method as e.g. explained with reference to FIG. 1. The processor receives as input one or more images (or at least one or more image portions) and provides as output one or more remapped images (or at least one or more remapped image portions). It shall be noted that the processor 14 (or any other, preferably programmable or pre-programmed apparatus) may be configured to perform the steps of the proposed method without making use of instructions provided from the storage medium.

FIG. 3 shows a schematic diagram illustrating another, more detailed embodiment of a proposed method for applying histogram equalization to an image. In addition to the steps of the first embodiment of the method explained with reference to FIG. 1 some additional steps are provided in this embodiment. It shall be noted, however, that in further embodiments only single ones of said additional step may be added to the first embodiment of the method.

Figure 4A:
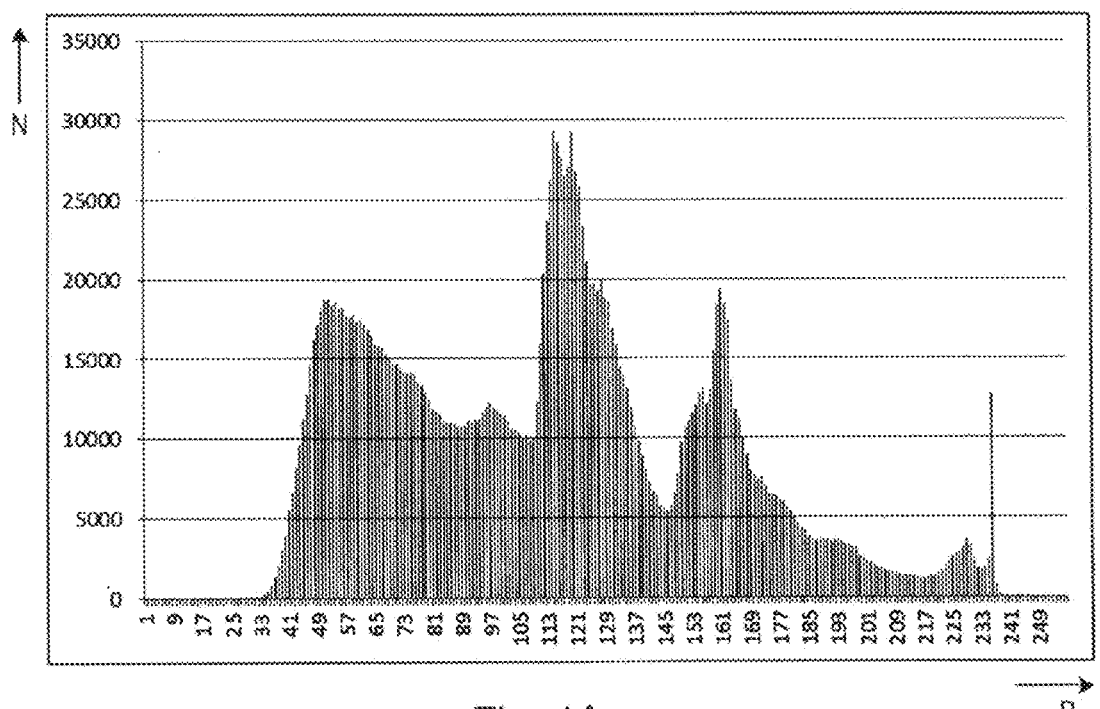
FIGS. 4A-4B show diagrams illustrating the results of a global histogram step.
Figure 4B:
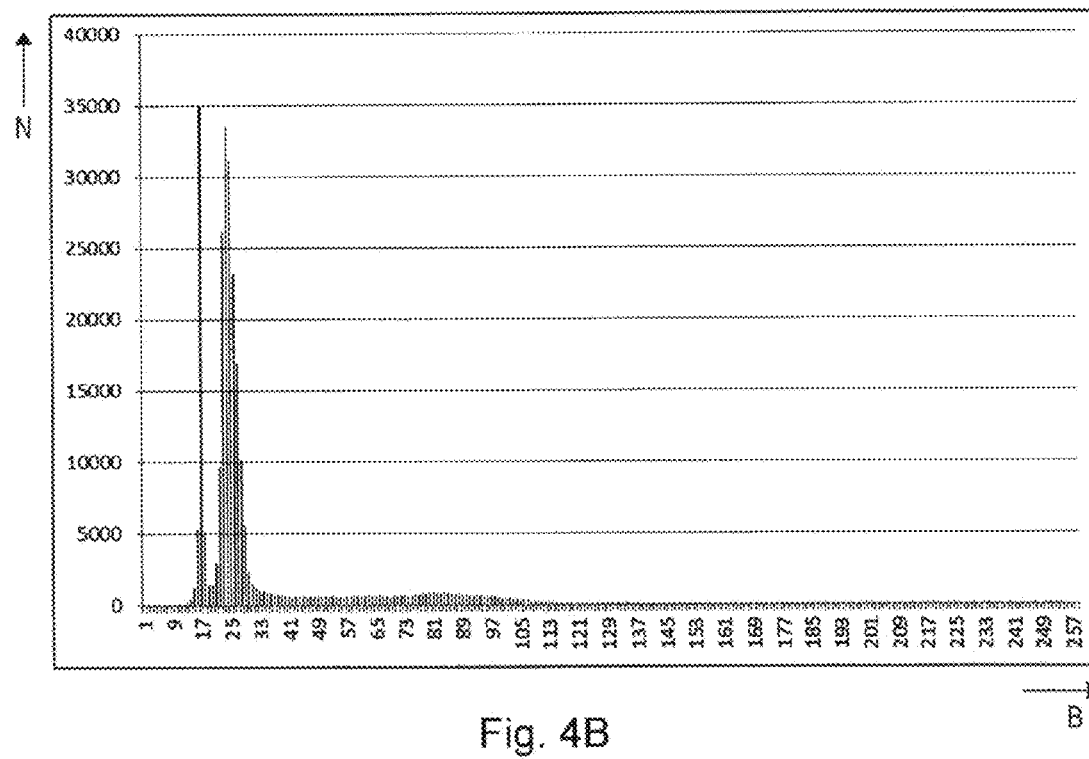

In step S20 a global histogram of an input image Y is calculated as explained above. Diagrams of such histogram data, showing the number N of occurrences over the various brightness values B (here, as an example, from 0 to 255) for two different images are shown in FIGS. 4A and 4B. While the histogram data shown in FIG. 4A shows a large distribution over the various brightness values, the histogram data show a large number of dark brightness values, but very few or even no light brightness values.

Figure 5A:
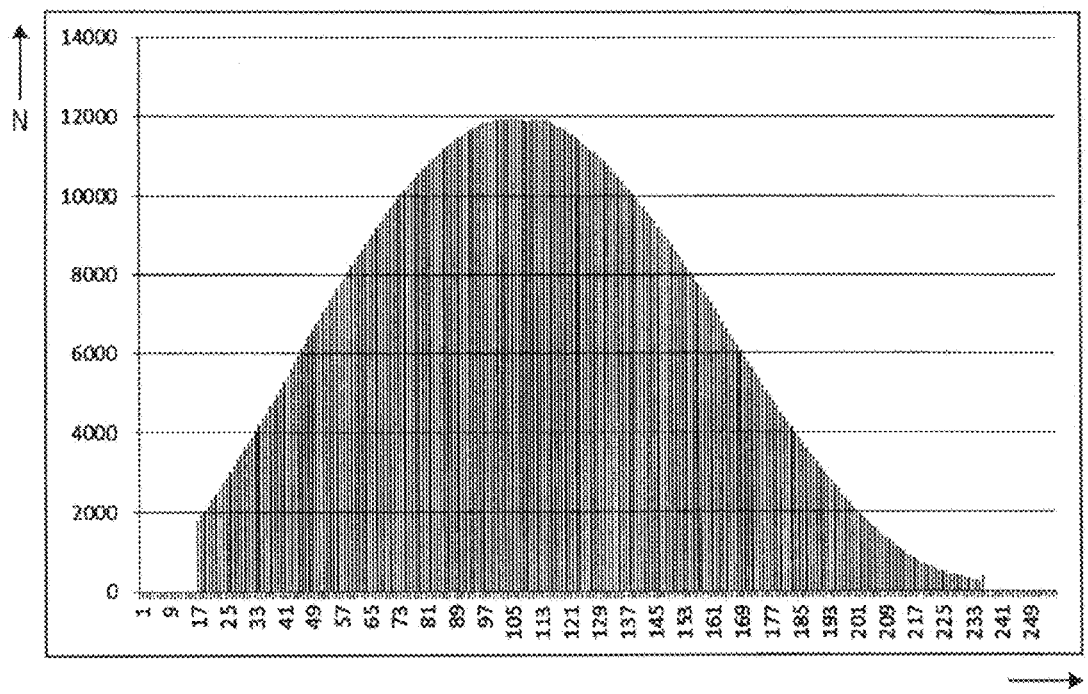
FIGS. 5A-5B show diagrams illustrating the results of a subsequent filtering step.
Figure 5B:
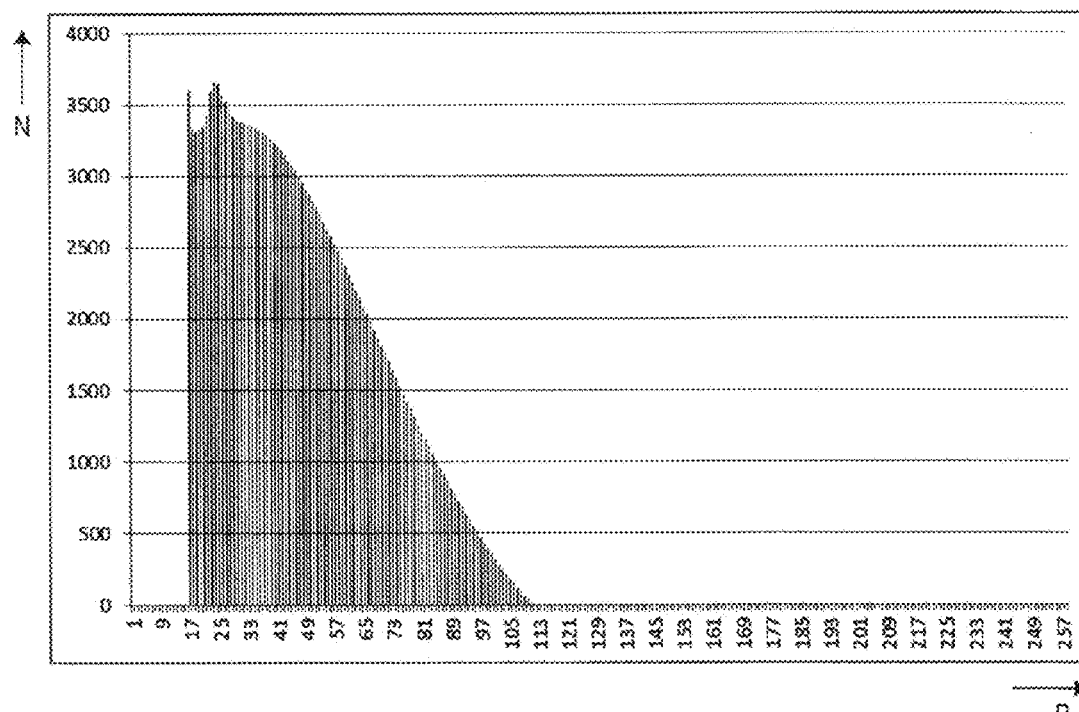

After generating the histogram data of the input image Y, a smoothing filter operation is introduced in step S22 to widen the region of interest and remove small peaks. This filter operation may use an IIR (Infinite Impulse Response) or a FIR (Finite Impulse Response) filter. In this step parameters including IIR (or FIR) coefficients, boundary conditions and the dynamic range are taken into account. Said boundary conditions can be a constant level mirrored from the first and last sample of said histogram data, the totally reflected said histogram data or total absorption, which means a constant zero level. Diagrams illustrating the result of said filtering step (filtering the histogram data shown in FIGS. 4A and 4B) are shown in FIGS. 5A and 5B. An embodiment of such a filtering step, which can be applied here, is e.g. described in EP1345172 A1 which is herein incorporated by reference.

A following full range equalization (e.g. over the range [0;255] or [16;235]) of histograms with a high percentage of a dark and bright area, respectively, would lead to extensive and over-enhanced remapping dark/bright values. Therefore, in the subsequent step S24 an image size dependent filling offset is introduced in the filtered histogram. In particular, in step S24 the filtered histogram data are filled up such that substantially all brightness values have a minimum number of occurrences. This is illustrated in FIGS. 6A and 6B, showing the effect of filling up the filtered histogram data shown in FIGS. 5A and 5B.

Figure 6A:
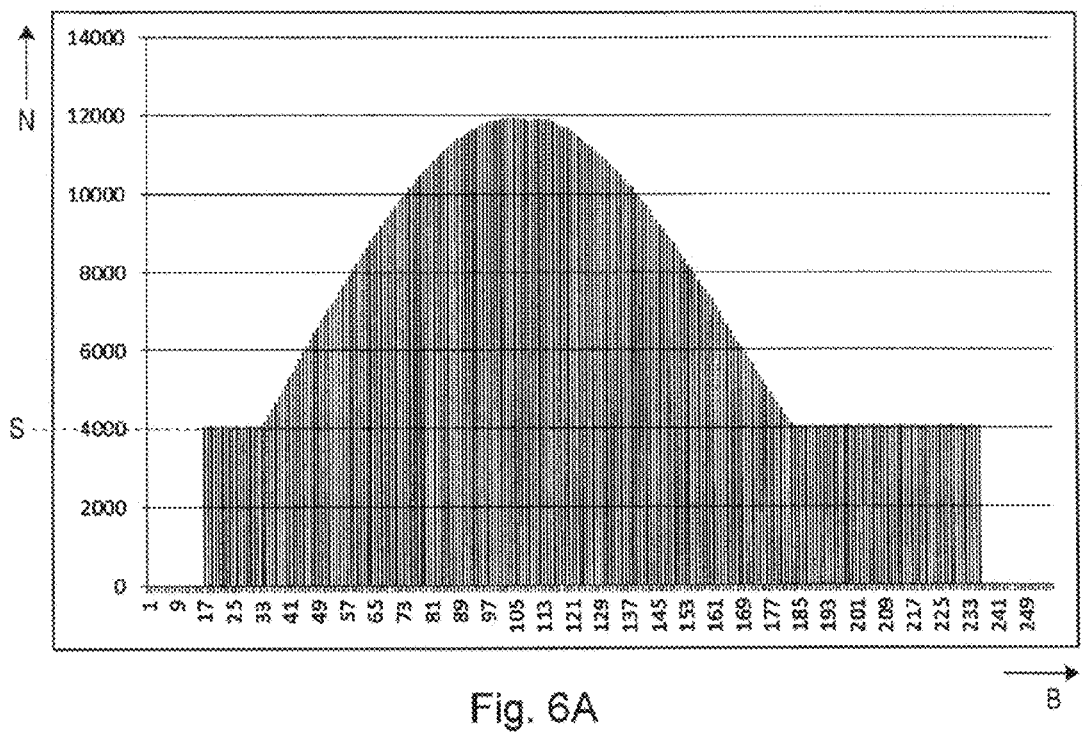
FIGS. 6A-6B show diagrams illustrating the results of a subsequent step of filling up the histogram and calculating a cumulative distribution function.
Figure 6B:
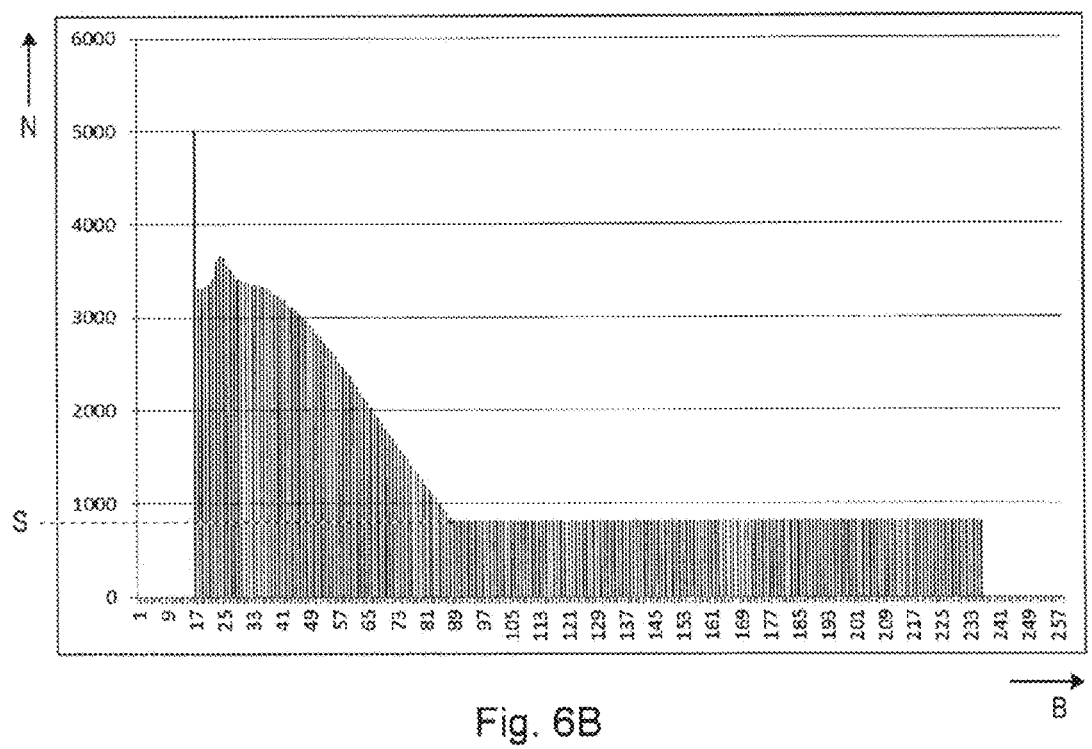

The (exemplary) minimum number S in FIG. 6A is 4000 and in FIG. 6B is 900. Generally, the minimum number S of occurrences of different brightness values is dependent on the image size of said at least one image portion of said input image. Preferably, the minimum number S of occurrences of different brightness values is in the range from 30 to 70%, in particular 40 to 60%, for instance 50%, of the total number of pixels of said at least one image portion of said input image. The minimum number S can be predetermined, e.g. by the user, or can be variable so that the user can change it on the fly based on a feedback of the obtained results.

Figure 7A:
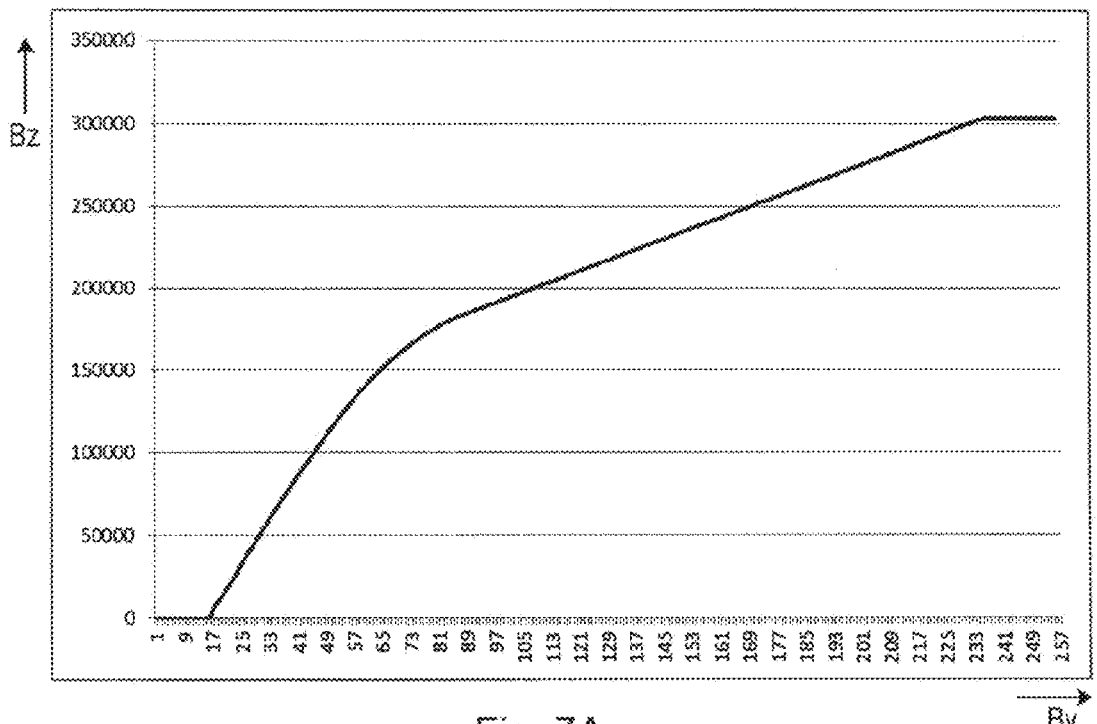
FIGS. 7A-7B show diagrams illustrating cumulative distribution functions calculated from the filled up histogram data shown in FIGS. 6A-6B, FIGS. 8A-8B show diagrams illustrating the results of a subsequent equalization step.
Figure 7B:
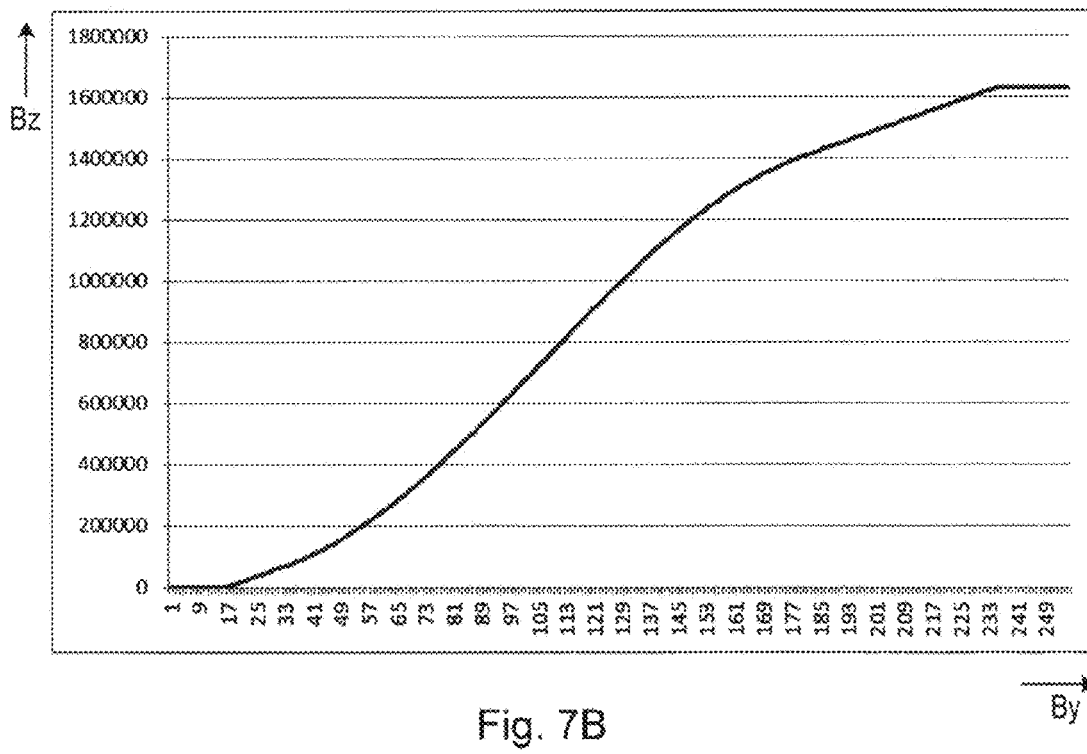

In step S26 the cumulative distribution function is calculated from said filled up histogram data. Diagrams illustrating the corresponding cumulative distribution functions for both examples are shown in FIGS. 7A and 7B.

Figure 8A:
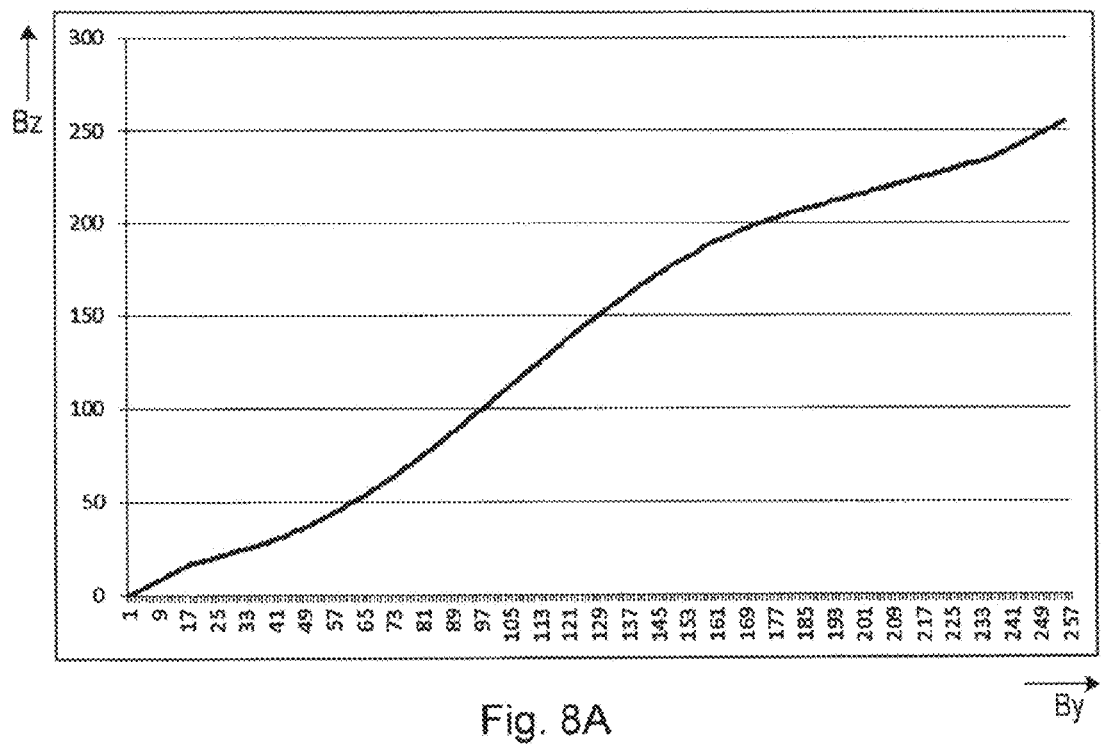
Figure 8B:
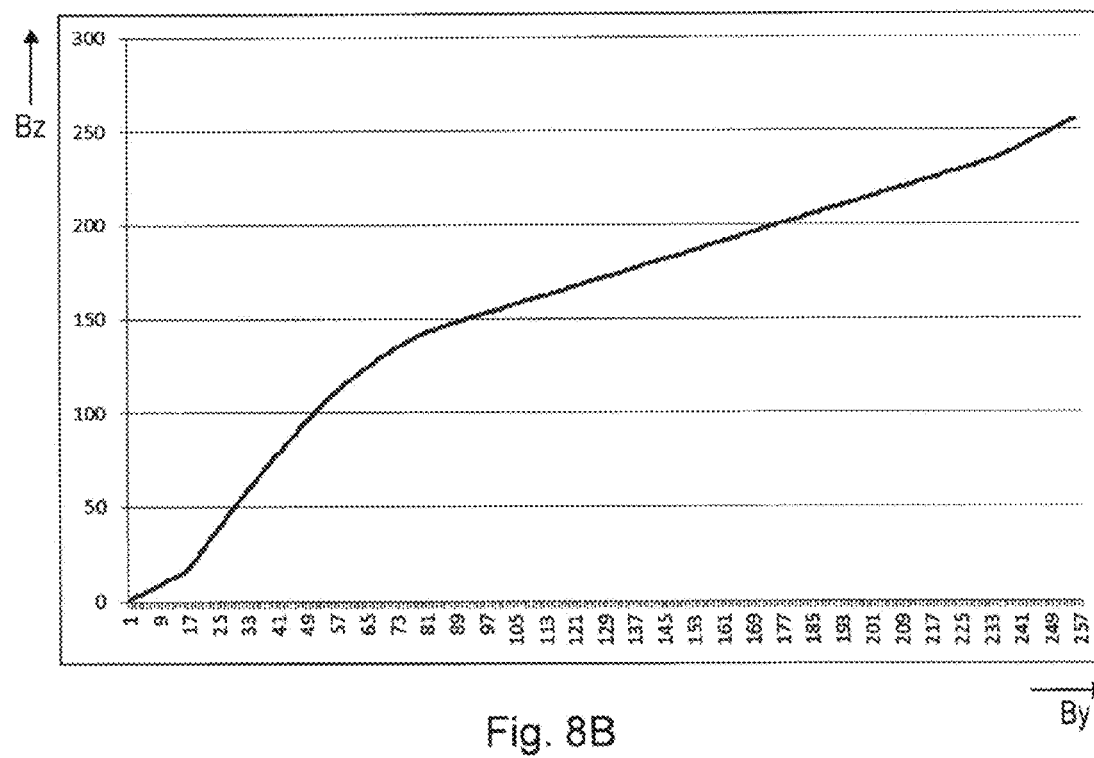

Now the equalization performed in step S28 results in a remapping function which retains the contrast enhancement effect but furthermore reduces extensive stretching and covers non-dominant areas by quasi linear remapping at the same time. Diagrams illustrating the result of the equalization step, based on the filled up histogram data shown in FIGS. 6A, 6B and in the corresponding cumulative distribution functions illustrated in FIGS. 7A and 7B, are shown in FIGS. 8A and 8B. These diagrams indicated the obtained remapping function indicating the function for remapping a brightness value of the input image Y to a brightness value of a remapped output image Z. In motion pictures this improvement prevents the introduction of content adaptive artifacts in consecutive image frames.

Figure 9A:
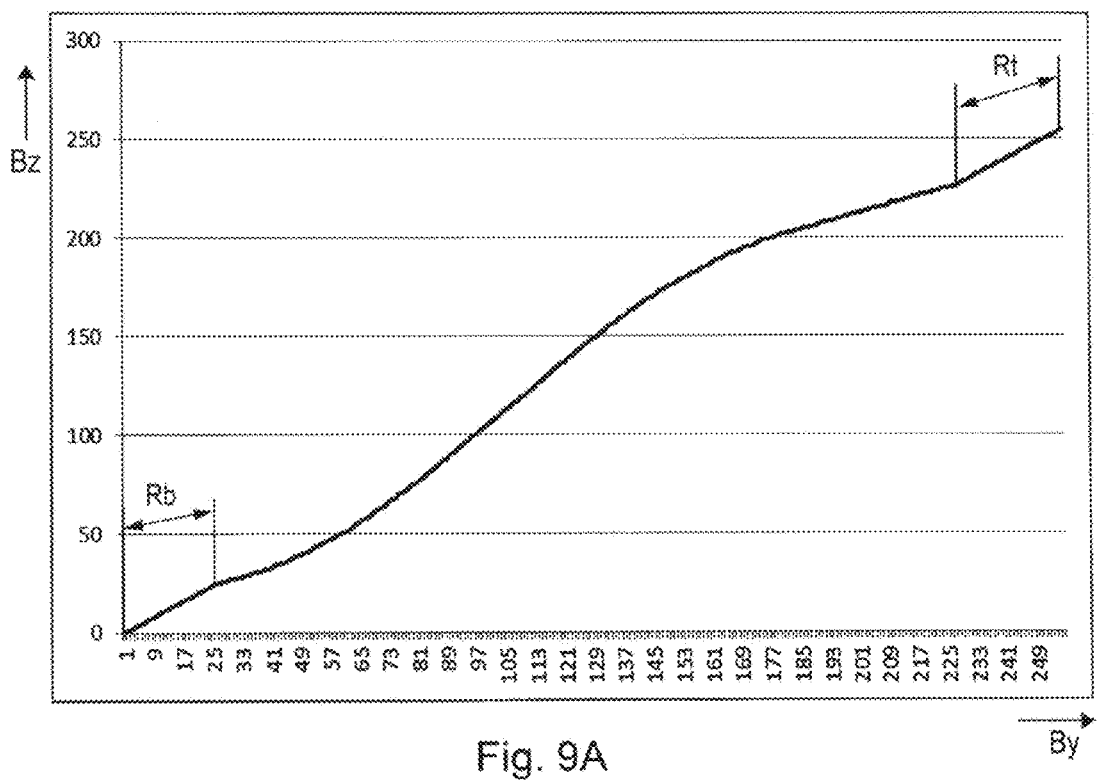
FIGS. 9A-9B show diagrams illustrating a remapping function in which top and bottom portions have been linearized.
Figure 9B:
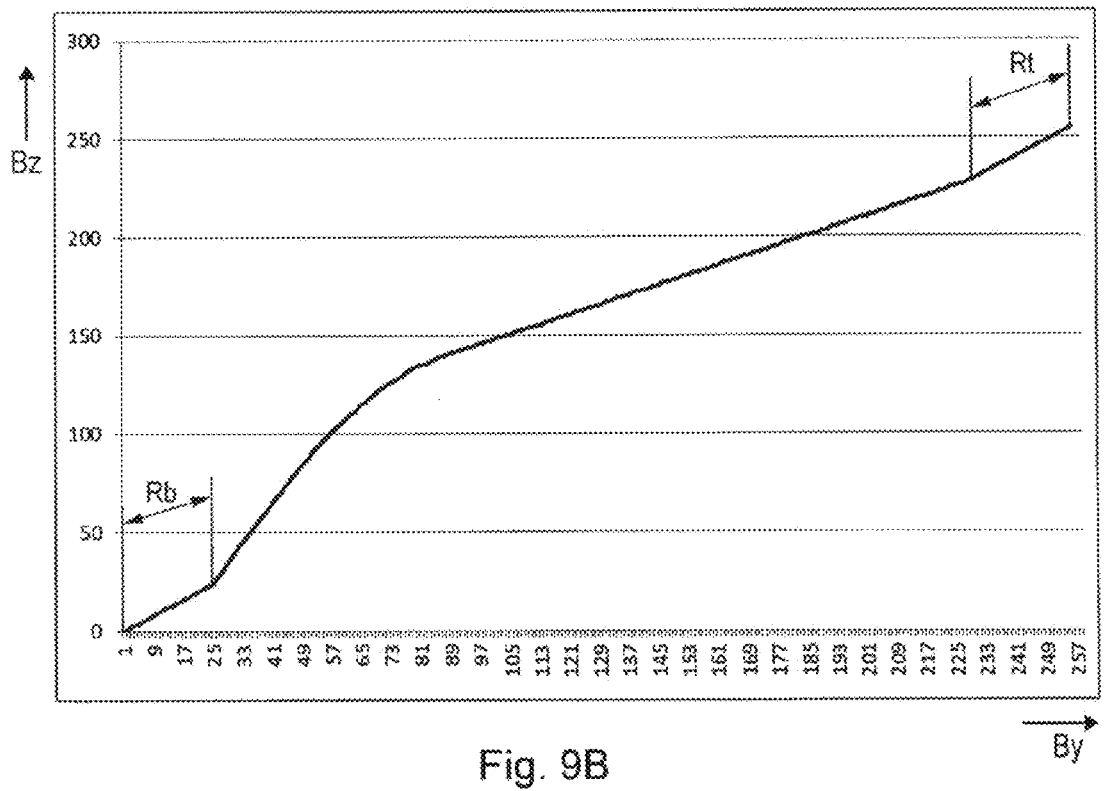
Figure 10A:
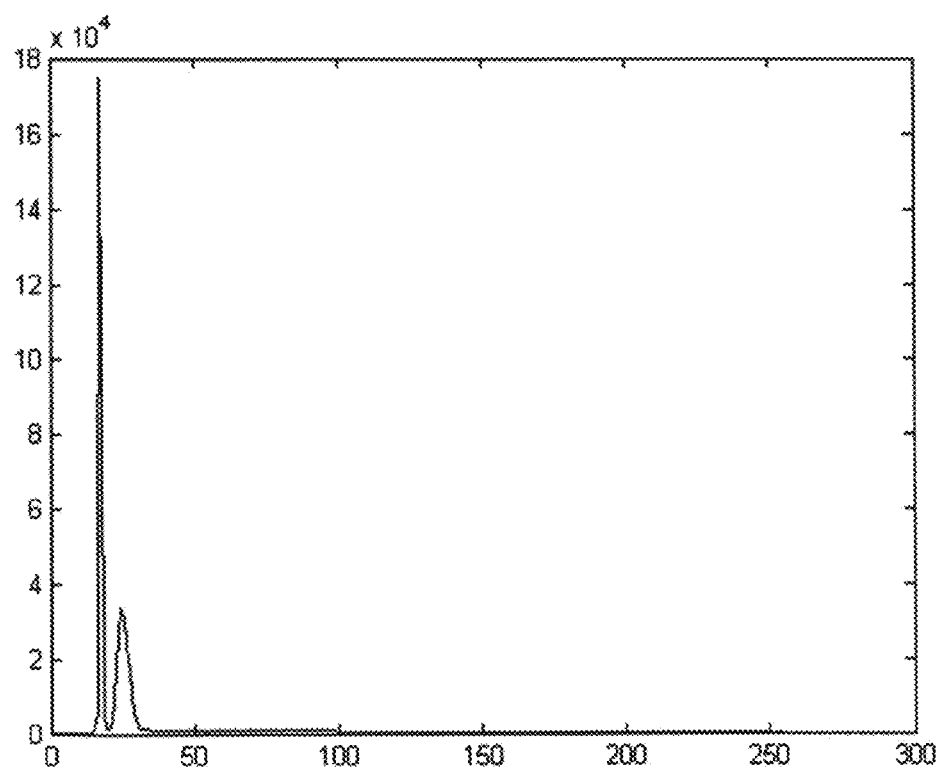
FIGS. 10A-10F show diagrams illustrating the effect of various steps of the proposed method.
Figure 10B:
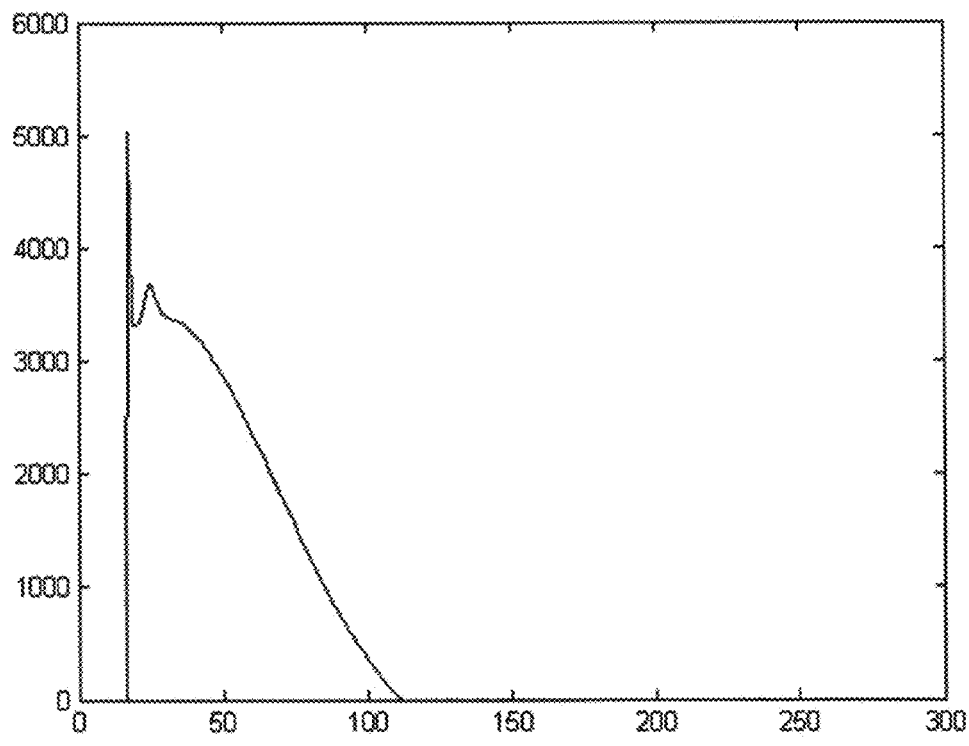
Figure 10C:
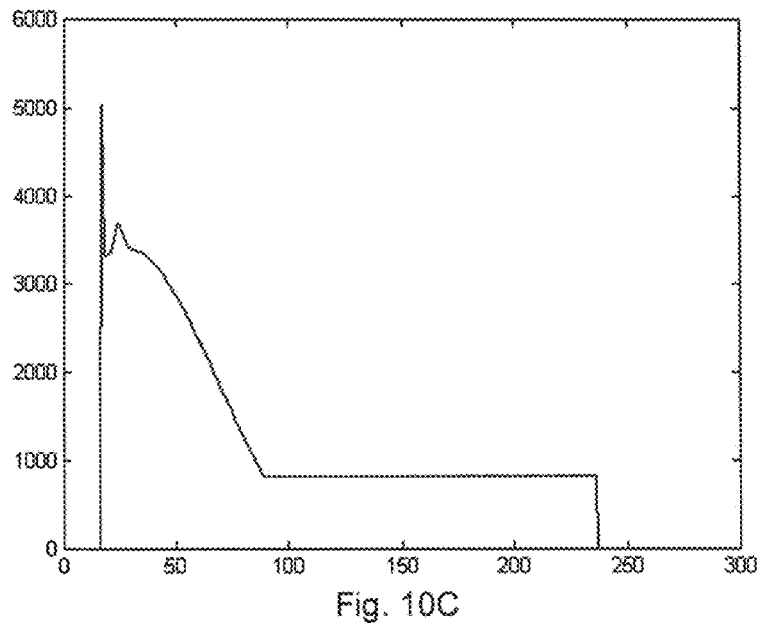
Figure 10D:
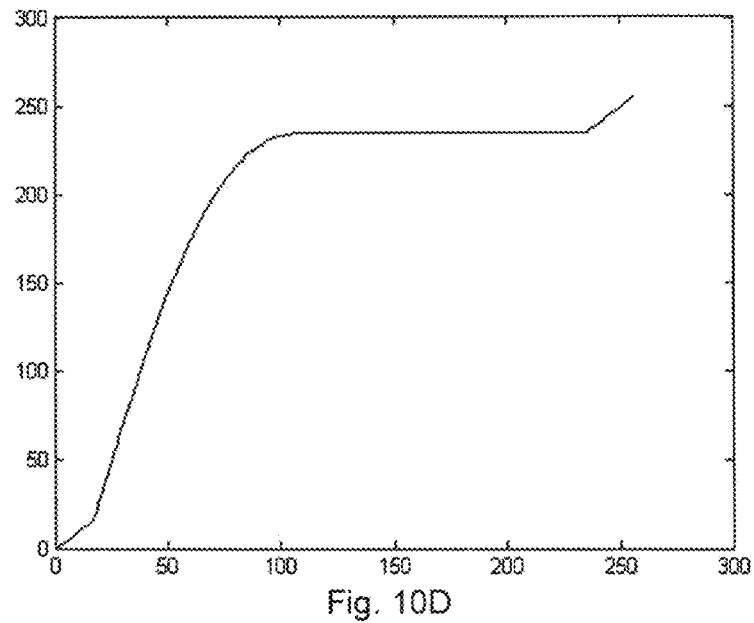
Figure 10E:
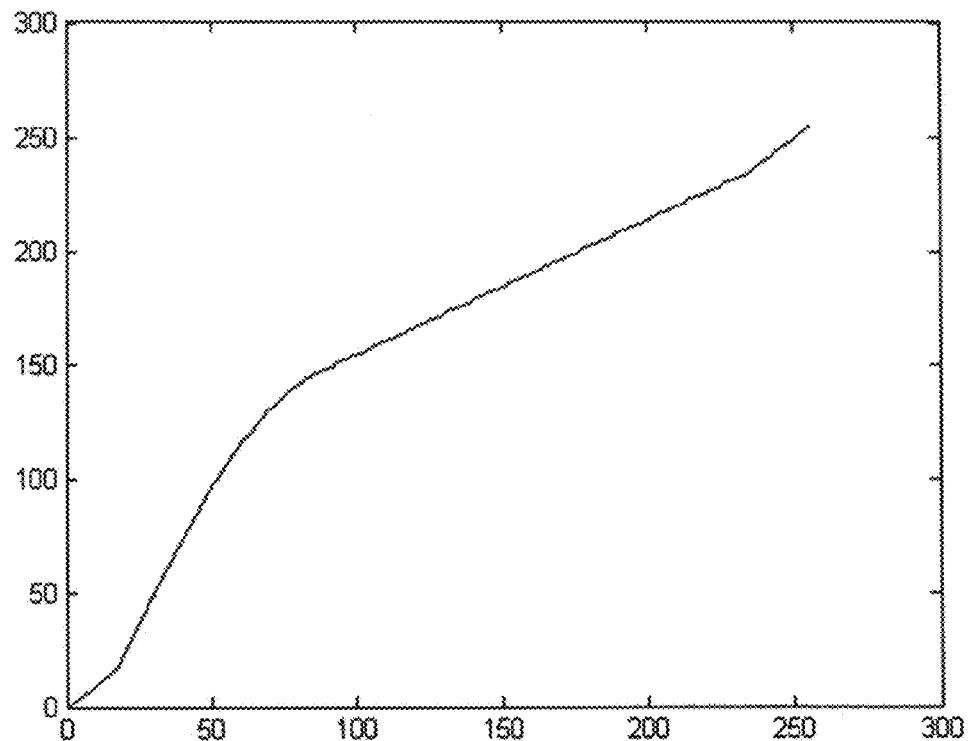
Figure 10F:
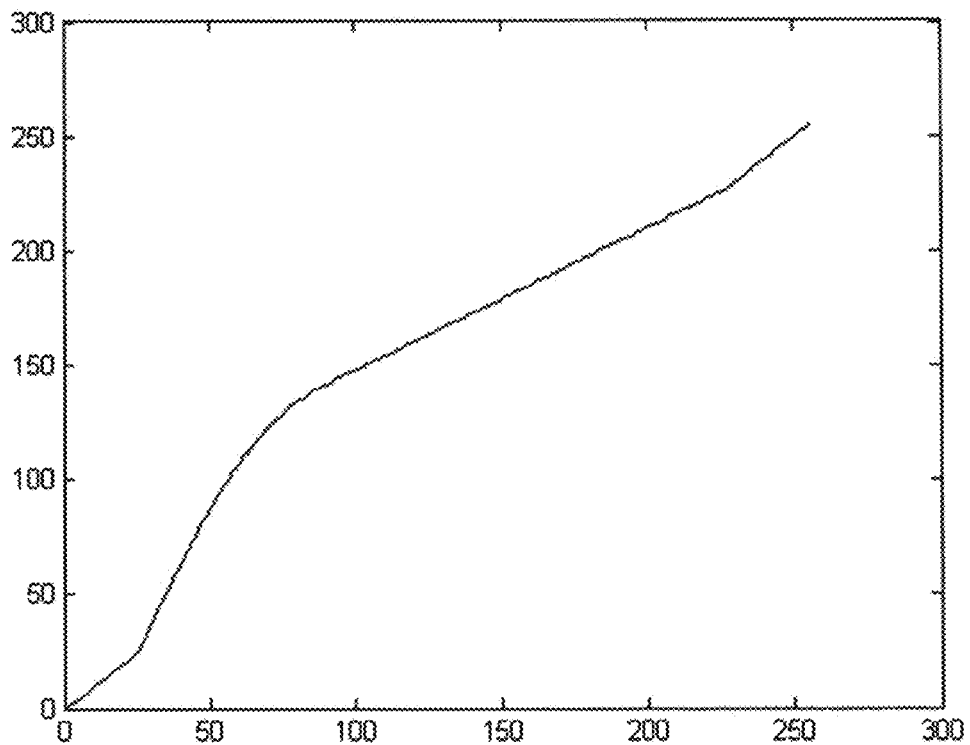

As a further improvement in another additional (optional) step S30 a top and/or bottom portion of said equalized cumulative distribution function is linearized before remapping said input image based on said equalized cumulative distribution function with linearized top and/or bottom portion. The sensitivity of the eye to distinguish little pixel differences in dark and bright areas is thus taken into account. To keep the black/white impression of the original input image the bottom and/or top values of the remapping function are remapped linear in the fixed range R as indicated the diagrams shown in FIGS. 9A and 9B showing the remapping functions shown in FIGS. 8A and 8B, but with linearized top and bottom portions Rt and Rb.

Finally, in step S32 said input image Y is remapped based on said equalized cumulative distribution function with linearized top and/or bottom portion. Preferably, said step S32 of remapping comprises mixing, per pixel, an original brightness value and a remapped brightness value by a weighted combination to obtain a final brightness value, i.e. a mixing factor (e.g. 50%) is applied which determines the weight by which the original brightness value and the remapped brightness value are combined to obtain the final brightness value. This mixing factor may be predetermined or may be set (or varied) by the user on the fly or when starting to use the proposed method.

FIG. 10 shows diagrams illustrating again the effect of the proposed solution. FIG. 10A shows a diagram of a global histogram. FIG. 10B shows a diagram of the filtered global histogram shown in FIG. 10A. FIG. 10C shows a filled up histogram using the histogram shown in FIG. 10B. FIG. 10D shows a diagram of a remapping function obtained from the filtered histogram shown in FIG. 10B after equalization without filling up the filtered histogram in advance. FIG. 10E shows a diagram of a remapping function obtained from the filtered histogram shown in FIG. 10C after equalization with filling up the filtered histogram in advance. FIG. 10F shows the remapping function shown in FIG. 10E with linearized top and bottom portions.

In summary, over-enhancement of images with a low dynamic range by histogram equalization as obtained in content adaptive contrast enhancement is avoided according to the proposed method, system and apparatus. The proposed solution reduces extensive stretching and covers non-dominant areas by quasi linear remapping while retaining the overall contrast enhancement effect at the same time. An optionally introduced sensitivity range keeps white as white and black as black.

Obviously, numerous modifications and variations of the present disclosure are possible in light of the above teachings. It is therefore to be understood that within the scope of the appended claims, the invention may be practiced otherwise than as specifically described herein.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

In so far as embodiments of the invention have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present invention. Further, such a software may also be distributed in other forms, such as via the Internet or other wired or wireless telecommunication systems.

The present application claims priority to European Patent Application 12 181 394.3, filed in the European Patent Office on Aug. 22, 2012, the entire contents of which being incorporated herein by reference.

The invention claimed is:

1. A method for applying histogram equalization to an image, comprising:
   calculating a histogram of at least one image portion of an input image to obtain histogram data representing the number of occurrences of different brightness values in said at least one image portion,
   determining a minimum number of occurrences of different brightness values required in said histogram data,
   filling up said histogram data, by increasing a number of occurrences of brightness values having initial occurrences less than said minimum number of occurrences, such that substantially all brightness values have said minimum number of occurrences,
   calculating a cumulative distribution function from said filled up histogram data,
   equalizing said cumulative distribution function in a predetermined range, and
   remapping said at least one image portion of the input image based on said equalized cumulative distribution function.

2. The method as claimed in claim 1,
   further comprising applying a smoothing filter to said histogram data before filling up said histogram data by use of the filtered histogram data.

3. The method as claimed in claim 1,
   further comprising linearizing a top and/or bottom portion of said equalized cumulative distribution function before remapping said input image based on said equalized cumulative distribution function with linearized top and/or bottom portion.

4. The method as claimed in claim 1,
   wherein said remapping comprises mixing, per pixel, an original brightness value and a remapped brightness value by a weighted combination to obtain a final brightness value.

5. The method as claimed in claim 1,
   wherein the minimum number of occurrences of different brightness values is dependent on the image size of said at least one image portion of said input image.

6. The method as claimed in claim 5,
   wherein the minimum number of occurrences of different brightness values is in the range from 30 to 70% of the total number of pixels of said at least one image portion of said input image.

7. The method as claimed in claim 5,
   wherein the minimum number of occurrences of different brightness values is in the range from 40 to 60% of the total number of pixels of said at least one image portion of said input image.

8. The method as claimed in claim 1,
   wherein the method is separately carried out for one or more color channels of an RGB input image.

9. The method as claimed in claim 1,
   wherein in the step of calculating a histogram a global histogram of the complete image is calculated and in the step of remapping the complete image is remapped.

10. The method as claimed in claim 1,
wherein the steps of calculating a histogram and remapping are performed for one or more image objects or blocks of an input image.

11. A system for applying histogram equalization to an image, said system comprising a processor and a computer-readable non-transitory storage medium, wherein the computer-readable non-transitory storage medium contains instructions for execution by the processor, wherein the instructions cause the processor to perform the steps of:

calculating a histogram of at least one image portion of an input image to obtain histogram data representing the number of occurrences of different brightness values in said at least one image portion, determining a minimum number of occurrences of different brightness values required in said histogram data, filling up said histogram data, by increasing a number of occurrences of brightness values having initial occurrences less than said minimum number of occurrences, such that substantially all brightness values have said minimum number of occurrences, calculating a cumulative distribution function from said filled up histogram data, equalizing said cumulative distribution function in a predetermined range, and remapping said at least one image portion of the input image based on said equalized cumulative distribution function.

12. The system as claimed in claim 11,
wherein the minimum number of occurrences of different brightness values is dependent on the image size of said at least one image portion of said input image.

13. The system as claimed in claim 12,
wherein the minimum number of occurrences of different brightness values is in the range from 30 to 70% of the total number of pixels of said at least one image portion of said input image.

14. An apparatus for applying histogram equalization to an image, said apparatus comprising:

processing circuitry configured to calculate a histogram of at least one image portion of an input image to obtain histogram data representing the number of occurrences of different brightness values in said at least one image portion, determine a minimum number of occurrences of different brightness values required in said histogram data, fill up said histogram data, by increasing a number of occurrences of brightness values having initial occurrences less than said minimum number of occurrences, such that substantially all brightness values have said minimum number of occurrences, calculate a cumulative distribution function from said filled up histogram data, equalize said cumulative distribution function in a predetermined range, and remap said at least one image portion of the input image based on said equalized cumulative distribution function.

15. The apparatus as claimed in claim 14,
wherein the minimum number of occurrences of different brightness values is dependent on the image size of said at least one image portion of said input image.

16. The apparatus as claimed in claim 15,
wherein the minimum number of occurrences of different brightness values is in the range from 30 to 70% of the total number of pixels of said at least one image portion of said input image.

* * * * *